United States Patent
Tsai et al.

(10) Patent No.: US 9,195,469 B2
(45) Date of Patent: Nov. 24, 2015

(54) NETWORK APPARATUS AND METHOD IN A COMPUTER SYSTEM OPERATING A BOOT-STRAP OR A WORK PERIOD

(75) Inventors: Chih-Fu Tsai, Kaohsiung County (TW); Jia-Ching Shen, Taipei (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 786 days.

(21) Appl. No.: 13/213,280

(22) Filed: Aug. 19, 2011

(65) Prior Publication Data
US 2012/0054482 A1    Mar. 1, 2012

(30) Foreign Application Priority Data

Aug. 24, 2010    (TW) ............................... 99128323 A

(51) Int. Cl.
*G06F 9/44* (2006.01)
*G06F 1/32* (2006.01)
*H04L 12/66* (2006.01)

(52) U.S. Cl.
CPC .............. *G06F 9/4401* (2013.01); *G06F 1/32* (2013.01); *G06F 1/3206* (2013.01); *H04L 12/66* (2013.01)

(58) Field of Classification Search
CPC ........... G06F 9/44; G06F 9/4401; G06F 1/32; G06F 1/3206; H04L 12/66
USPC .................................................. 713/1, 2, 320
See application file for complete search history.

(56) References Cited

U.S. PATENT DOCUMENTS

| | | | | |
|---|---|---|---|---|
| 6,138,240 A | * | 10/2000 | Tran et al. | 726/19 |
| 6,212,645 B1 | | 4/2001 | Tjandrasuwita | |
| 2002/0078118 A1 | * | 6/2002 | Cone et al. | 709/101 |
| 2008/0005415 A1 | * | 1/2008 | Lopez et al. | 710/62 |
| 2008/0244108 A1 | * | 10/2008 | Abramson et al. | 710/16 |
| 2009/0313492 A1 | | 12/2009 | Lerman | |
| 2010/0318829 A1 | * | 12/2010 | Tamura | 713/340 |
| 2012/0278598 A1 | * | 11/2012 | Wang et al. | 713/2 |

FOREIGN PATENT DOCUMENTS

CN    102057344 A    5/2011

OTHER PUBLICATIONS

Intellectual Property Office, Ministry of Economic Affairs, R.O.C., "Office Action", May 16, 2014, Taiwan.
State Intellectual Property Office of the People's Republic of China, "Office Action", China, Aug. 22, 2014.
Intellectual Property Office, Ministry of Economic Affairs, R.O.C., "Office Action", Dec. 19, 2014, Taiwan.

* cited by examiner

*Primary Examiner* — Chun Cao
(74) *Attorney, Agent, or Firm* — Morris, Manning & Martin, LLP

(57) ABSTRACT

The present invention discloses a network apparatus and enabling method thereof. During the procedure of voltage biasing or host booting, an enabling signal generated in this network apparatus is provided for enabling the internal application circuit at first. At the time of data connection between the network apparatus and a corresponding host apparatus, the host apparatus is able to enable or disable the application circuit of the network apparatus via a predetermined pin.

14 Claims, 3 Drawing Sheets

NETWORK APPARATUS AND METHOD IN A COMPUTER SYSTEM OPERATING A BOOT-STRAP OR A WORK PERIOD

CROSS-REFERENCE TO RELATED APPLICATIONS

This non-provisional application claims priority under 35 U.S.C. §119(a) on Patent Application No. 099128323 filed in Taiwan (R.O.C.) on Aug. 24, 2010, the entire contents of which are hereby incorporated by reference.

BACKGROUND OF THE INVENTION

1. Field of the Invention

The present invention relates to a network apparatus, more particularly, a method for enable or disable the network apparatus.

2. Description of the Prior Arts

On the premise of environment protection, saving power is inevitable with the uprising need for it in electrical equipment. Regarding to a host, the early system may keep a pin as chip enable/power down for allowing chip to hold the chip enable circuit under disable/power down state to save power. However, it must make the pin as chip enable first, and then use the chip or perform the chip set when the host is booted strap or the bias voltage is occurred on the chip, resulting in it usually generates a problem for the boot-strap set of the host. Thereby, it is an issue worth of research that how to set the system elastically and not to increase the burden of the operation system in the host.

Afterward, since the host software (or operation system (OS)) is combined with the model hardware of the system, the industry further develops a Plug and Play chip. Therefore, in actual application, the Plug and Play chip does not have a chip enable/power down pin. Therefore, if the Plug and Play chip want to enter the save power mode, the host must command an instruction to control the save power mode of the chip by using software. However, compared this way by using software to command a instruction to control the save power mode of the chip and the chip with the enable pin, the efficiency of saving power of this way is insufficient.

SUMMARY OF THE INVENTION

According to one object of the present invention, the present invention provides an apparatus or a method for decreasing the power that the plug model needs and not increasing the burden of the operation system in the host.

According to one object of the present invention, the present invention provides elastic enable signal with the plug model and decreasing the power that the plug model needs simultaneously.

According to one embodiment, the present invention provides a network apparatus, mounted in a computer system operating a boot-strap period or a work period, comprising: a communication interface; a enabling circuit, coupled to the communication interface, for generating a internal enabling signal; and an application circuit, coupled to the enabling circuit, for performing the application circuit operation according to the internal enabling signal; wherein the enabling circuit generates the internal enabling signal to enable the application circuit in the boot-strap period, and the enabling circuit generates the internal enabling signal according to a external enabling instruction signal outputted from the communication interface for determining whether enable or disable the application circuit.

According to another embodiment, the present invention provides method for a network apparatus, comprising: providing a internal enabling signal; enabling operation of an application circuit according to the internal enabling instruction signal if the network apparatus is in boot-strap period; and generating the internal enabling signal according to a external enabling instruction signal for determining whether enable or disable the application circuit.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become readily understood from the detailed description given herein below and the accompanying drawings which are given by way of illustration only, and thus are not limitative of the present invention and wherein.

DESCRIPTION OF THE EXEMPLARY EMBODIMENTS

The following descriptions are of exemplary embodiments only, and are not intended to limit the scope, applicability, or configuration of the invention in any way. Rather, the following description provides a convenient illustration for implementing exemplary embodiments of the invention. Various changes to the described embodiments may be made in the function and arrangement of the elements described. For your esteemed members of reviewing committee to further understand and recognize the fulfilled functions and structural characteristics of the invention, several exemplary embodiments cooperating with detailed description are presented as the follows.

Figure 1:
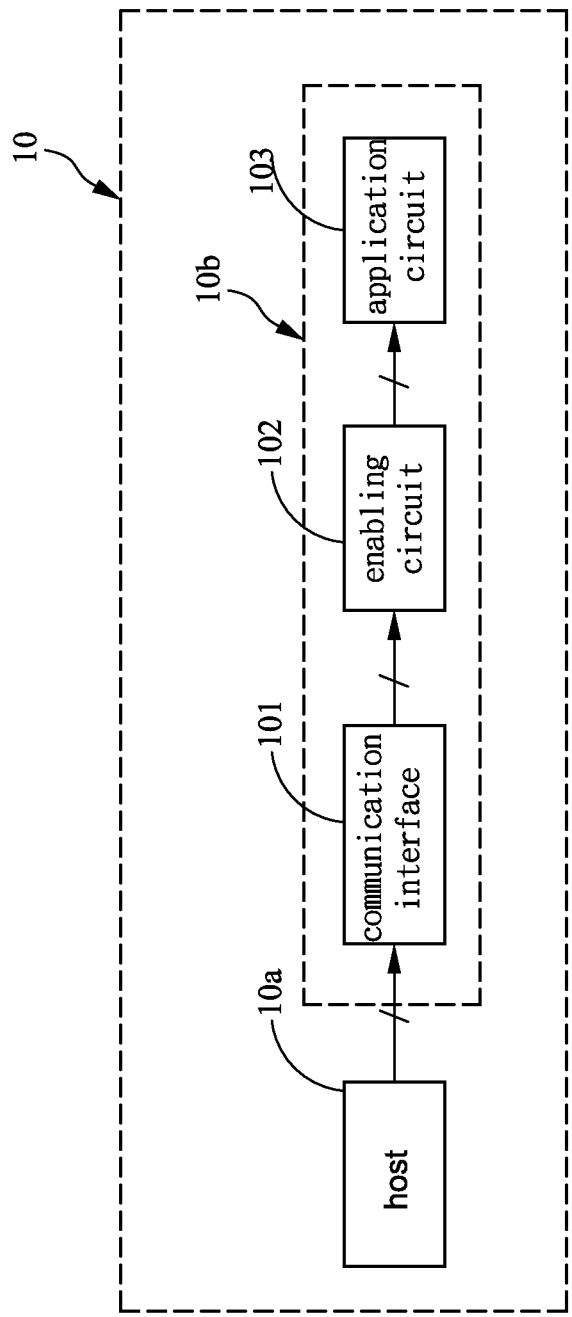
FIG. 1 illustrates a schematic diagram of a computer system 10 according to one embodiment of the present invention.

FIG. 1 is a block diagram illustrating a computer system 10 according to one embodiment of the present invention. The computer system 10 operating in boot-strap period or a work period comprises a host 10a and a network apparatus 10b coupled to the host 10a. The network apparatus 10b mounted in the computer system 10 further comprises: a communication interface 101; an enabling circuit 102 coupled to the communication interface 101 is used for generating an internal enabling signal ICE; an application circuit 103 coupled to the enabling circuit 102 is used for performing the application circuit operation according to the internal enabling signal. Specifically, the enabling circuit 102 generates the internal enabling signal ICE in advance to enable the application circuit 103 in the boot-strap period, and the enabling circuit 102 generates the internal enabling signal ICE according to an external enabling instruction signal OCE outputted from the communication interface 101 for determining whether enable or disable the application circuit 103. The application circuit 103 is divided to physical (PHY) layer circuit or media access control (MAC) layer circuit.

Taking the network apparatus 10b being a Ethernet Network model as an example, data connection may mean that the data is formally received and transferred after the hand shaking is operated between the network apparatus 10b and the host 10a. Taking the network apparatus 10b being a Industry Standard Architecture (ISA) as an example, the data connection is began to perform between the network apparatus 10b and the host 10a when the output of liner feedback shift register (LFSR) (not shown in) of the communication interface in the ISA is enable active. The communication interface 101 also includes a decoder (not shown in) used for decoding the address signal and the control signal from the host 10a.

The network apparatus 10b is also a universal serial bus (USB) device. The

Ethernet Network Model or ISA is cold plug, and USB is hot plug. The data connection of the USB is defined as the host 10a and the network apparatus 10b may formally transfer and receive the data after the host 10a coupled to the network apparatus 10b provides power source to the network apparatus 10b via the communication interface 101. The predetermined pin is selected from general purpose I/O (GPIO) in the communication interface 101.

General speaking, it is impossible that the locations of enabling pins and polarity of the network apparatus 10b on market are the same, resulting in it is difficult to set host 10a. Therefore, in accordance with one embodiment of the present invention, it further describes that the enabling circuit 102 informs the information to the predetermined pin described by the host 10a via the communication interface 101, and the enabling circuit 102 sets enable polarity of the internal enabling signal ICE as low-voltage enable, high-voltage enable or predetermined plus enable according to instruction from the host 10a.

The advantages of predetermined plus enable is in that some plus in the communication interface are always reserved when the data interconnection is performed between the network apparatus 10b and the host 10a. Thereby, under considering to save the number of pins of the network apparatus 10b, the host 10a may transfer a hold signal from the communication interface 101 to the network apparatus 10b, resulting in the network apparatus 10b may perform the enable or disable from the communication interface from a pin in the communication interface 101, and may not need to set a extra enable pin simultaneously.

Figure 2:
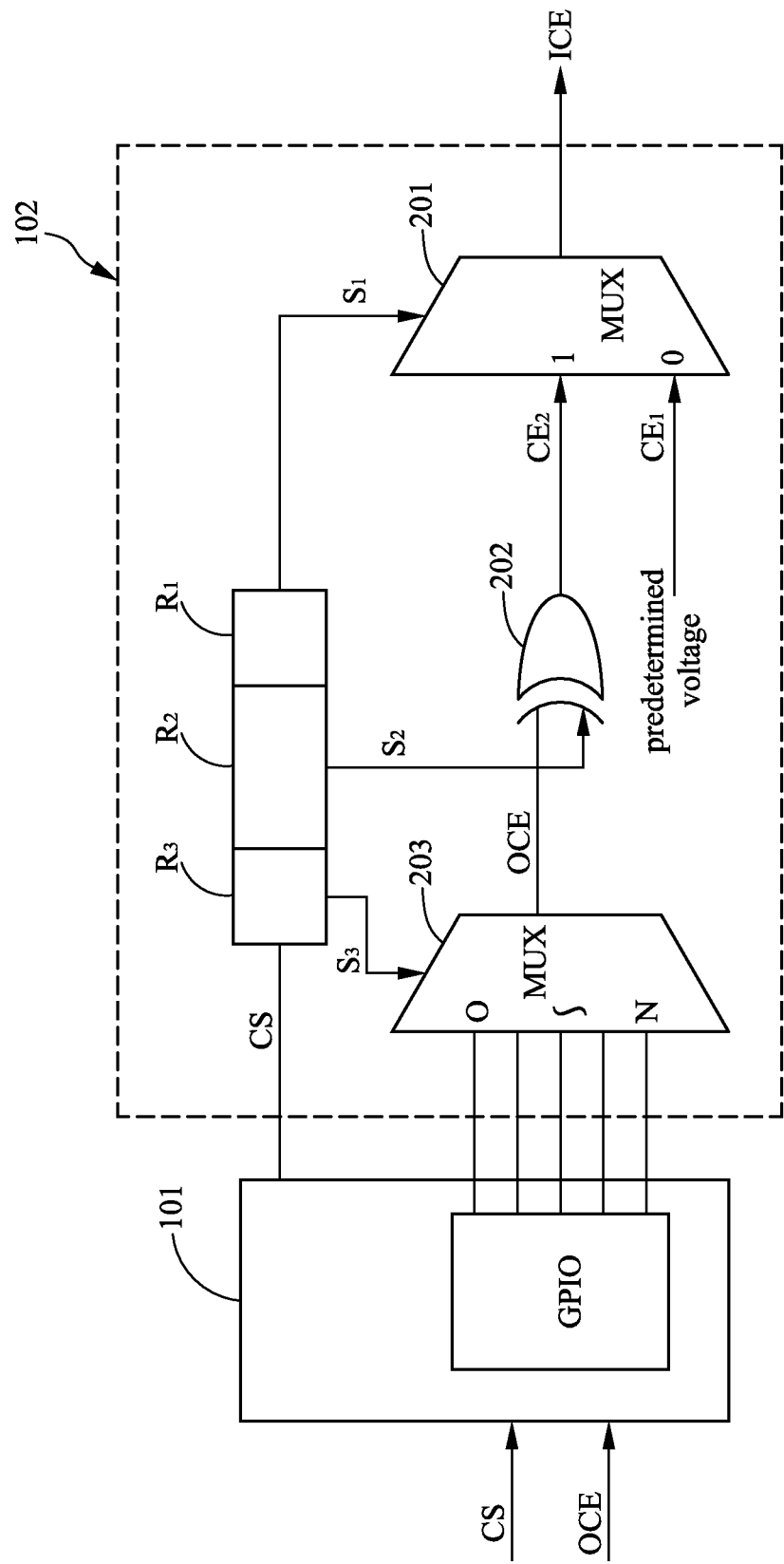
FIG. 2 illustrates a schematic diagram of the enabling circuit 102 of the present invention according to one embodiment.

FIG. 2 illustrates an enabling circuit of the present invention according to one embodiment. The enabling circuit 102 comprises a first multiplexer 201 for selectively outputting a first enabling signal CE1 or a second enabling signal CE2 as the internal enabling signal ICE according to an enabling select signal S1. Wherein the first enabling signal CE1 is not related to the external enabling instruction signal OCE and the second enabling signal CE2 is related to the external enabling instruction signal OCE; a polarity control unit 202, for determining polarity of the internal enabling signal ICE according to a polarity control signal S2; and a second multiplexer 203 coupled to a plurality of pins in the communication interface 101, for determining a pin from the pins according to a pin select signal S3 so as to output the external enabling instruction signal OCE to the polarity control unit 202.

The enabling circuit 102 further comprises a first register R1 is used for storing a first register value so as to control the enabling select signal S1, wherein the first register value control the enabling select signal S1 to make the first enabling signal CE1 as the internal enabling signal ICE in the boot-strap period, and the first register values control the enabling select signal S1 to make the second enabling signal CE2 as the internal enabling signal ICE.

The enabling circuit 102 further comprises: a second register R2 is used for storing a second register value so as to control the polarity control signal S2; and a third register R3 is used for storing a third register value so as to control the pin select signal S3.

Figure 3:
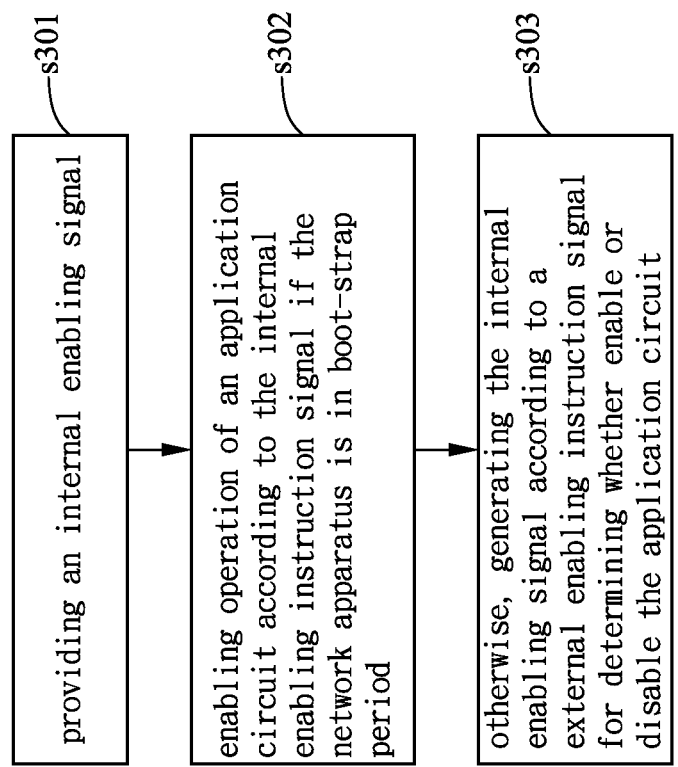
FIG. 3 illustrates a flow chart of the method for applying the network apparatus of the preset invention.

FIG. 3 illustrates a method of applying a network apparatus according to one embodiment of the present invention. The steps of method comprises:

S301: providing a internal enabling signal ICE;

S302: enabling operation of an application circuit according to the internal enabling instruction signal if the network apparatus is in boot-strap period; and S303: generating the internal enabling signal according to an external enabling instruction signal for determining whether enable or disable the application circuit.

Preferably, selectively outputting a first enabling signal CE1 or a second enabling signal CE2 as the internal enabling signal ICE according to a enabling select signal S3, wherein the first enabling signal CE1 is not related to the external enabling instruction signal OCE, and the second enabling signal CE2 is related to the external enabling instruction signal OCE, and storing a first register value to control the enabling select signal S1, wherein the first register value control the enabling select signal S1 to make the first enabling signal CE1 as the internal enabling signal ICE in the boot-strap period, and the first register values control the enabling select signal Si to make the second enabling signal CE2 as the internal enabling signal ICE, and determining polarity of the internal enabling signal ICE according to a polarity control signal S2.

In accordance with the embodiments mentioned above, it is clear that, by referring to the predetermined value of the first register R1, the enabling circuit 102 generates the internal enabling signal in advance to enable the application circuit 103 in the boot-strap period, resulting in the network apparatus 10b is enabled without waiting for external enabling instruction signal OCE. The network 10b uses an enable pin to control the function of saving power according to the external enabling instruction signal OCE after boot-strap.

Additionally, the decision of enable pin is controlled by the third register R3 in order to prevent wire-wrap difficulty occurred on the enable pin and host 10a on the PCB. Therefore, it may increase the pin application elasticity.

Moreover, regarding to the polarity of the signal, the present invention uses the second register R2 to prevent the false action occurred when the conflict is occurred between the network apparatus 10a and the host 10a.

The invention being thus aforesaid, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A network apparatus, mounted in a computer system operating a boot-strap period or a work period, comprising:
   a communication interface;
   an enabling circuit, coupled to the communication interface, for generating an internal enabling signal; and
   an application circuit, coupled to the enabling circuit, for performing the application circuit operation according to the internal enabling signal;
   wherein the enabling circuit generates the internal enabling signal to enable the application circuit in the boot-strap period, and the enabling circuit generates the internal enabling signal according to a external enabling instruction signal outputted from the communication interface for determining whether enable or disable the application circuit after the boot-strap period; and whereby the network apparatus is able to be enabled prior to the external enabling instruction signal during the boot-strap period and execute a power saving function according to the external enabling instruction signal after the boot-strap period.

2. The network apparatus as recited in claim 1, wherein the enabling circuit comprises:
a first multiplexer, for selectively outputting a first enabling signal or a second enabling signal as the internal enabling signal according to a enabling select signal;
wherein the first enabling signal is not related to the external enabling instruction signal, and the second enabling signal is related to the external enabling instruction signal.

3. The network apparatus as recited in claim 2, wherein the enabling circuit comprises:
a first register, for storing a first register value so as to control the enabling select signal;
wherein the first register value control the enabling select signal to make the first enabling signal as the internal enabling signal in the boot-strap period, and the first register values control the enabling select signal to make the second enabling signal as the internal enabling signal.

4. The network apparatus as recited in claim 1, wherein the enabling circuit comprises:
a polarity control unit, for determining polarity of the internal enabling signal according to a polarity control signal.

5. The network apparatus as recited in claim 4, wherein the enabling circuit comprises:
a second register, for storing a second register value so as to control the polarity control signal.

6. The network apparatus as recited in claim 1, wherein the enabling circuit comprises:
a multiplexer, coupled to a plurality of pins in the communication interface, for determining a pin from the pins according to a pin select signal so as to output the external enabling instruction signal.

7. The network apparatus as recited in claim 6, wherein the enabling circuit comprises:
a third register, for storing a third register value so as to control the pin select signal.

8. A method for a network apparatus, comprising:
providing an internal enabling signal;
enabling operation of an application circuit of the network apparatus according to the internal enabling instruction signal if the network apparatus is in boot-strap period; and
generating the internal enabling signal according to a external enabling instruction signal for determining whether enable or disable the application circuit after the boot-strap period in order to enable the network apparatus prior to the external enabling instruction signal during the boot-strap period and execute a power saving function according to the external enabling instruction signal after the boot-strap period.

9. The method as recited in claim 8, further comprising:
selectively outputting a first enabling signal or a second enabling signal as the internal enabling signal according to an enabling select signal, wherein the first enabling signal is not related to the external enabling instruction signal, and the second enabling signal is related to the external enabling instruction signal.

10. The method as recited in claim 9, further comprising:
storing a first register value to control the enabling select signal, wherein the first register value control the enabling select signal to make the first enabling signal as the internal enabling signal in the boot-strap period, and the first register values control the enabling select signal to make the second enabling signal as the internal enabling signal.

11. The method as recited in claim 8, further comprising:
determining polarity of the internal enabling signal according to a polarity control signal.

12. The method as recited in claim 11, further comprising:
storing a second register value for controlling the polarity control signal.

13. The method as recited in claim 8, further comprising:
determining a pin from a plurality of pins according to a pin select signal for outputting the external enabling instruction signal.

14. The method as recited in claim 13, further comprising:
storing a third register value for control the pin select signal.

* * * * *